(12) United States Patent
Chiba et al.

(10) Patent No.: US 9,340,107 B2
(45) Date of Patent: May 17, 2016

(54) SUPPORT STRUCTURE FOR FUEL LID

(71) Applicant: KABUSHIKI KAISHA TOYOTA JIDOSHOKKI, Kariya-shi, Aichi-ken (JP)

(72) Inventors: Kenji Chiba, Tokai (JP); Akihisa Okada, Kariya (JP); Nobukazu Kato, Kariya (JP); Yasuhiro Hatta, Kariya (JP); Hirofumi Arima, Kariya (JP)

(73) Assignees: KABUSHIKI KAISHA TOYOTA JIDOSHOKKI, Aichi-ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/428,707

(22) PCT Filed: Aug. 21, 2013

(86) PCT No.: PCT/JP2013/072321
§ 371 (c)(1),
(2) Date: Mar. 17, 2015

(87) PCT Pub. No.: WO2014/045790
PCT Pub. Date: Mar. 27, 2014

(65) Prior Publication Data
US 2015/0217638 A1    Aug. 6, 2015

(30) Foreign Application Priority Data
Sep. 19, 2012    (JP) .................................. 2012-205890

(51) Int. Cl.
*B60K 15/05* (2006.01)
*F16J 13/18* (2006.01)
*F16J 15/10* (2006.01)

(52) U.S. Cl.
CPC ................. *B60K 15/05* (2013.01); *F16J 13/18* (2013.01); *F16J 15/10* (2013.01); *B60K 2015/053* (2013.01); *B60K 2015/0553* (2013.01)

(58) Field of Classification Search
CPC ............. B60K 15/05; B60K 2015/053; B60K 2015/0546; B60K 2015/0553; F16J 13/18; F16J 15/10
USPC ....................................................... 296/97.22
See application file for complete search history.

(56) References Cited

U.S. PATENT DOCUMENTS 5,954,387 A * 9/1999 Fisher ................ B60K 15/0406
220/86.2
8,985,668 B2 * 3/2015 Ogata ...................... F16J 15/02
220/86.2

(Continued)

FOREIGN PATENT DOCUMENTS

JP    57-177666 U    11/1982
JP    3112424 U    11/1991

(Continued)

OTHER PUBLICATIONS

English Translation of International Preliminary Report on Patentability in counterpart International Application No. PCT/JP2013/072321.

(Continued)

*Primary Examiner* — Gregory Blankenship
(74) *Attorney, Agent, or Firm* — Sughrue Mion, PLLC

(57) ABSTRACT

A support structure for a fuel lid attached by a hinge to a vehicle body is provided with an annular rubber seal, which is provided on the vehicle body to surround an oil filler port in the vehicle body. The rubber seal has a top surface and an inner circumferential surface. The support structure includes a contact plate provided on a back surface of the fuel lid. The contact plate contacts the rubber seal when the fuel lid is in the closed state. The contact plate has an upper surface contact portion for contacting the upper surface of the rubber seal, and an inner-surface contact portion for contacting the inner circumferential surface of the rubber seal.

8 Claims, 3 Drawing Sheets

(56) References Cited

U.S. PATENT DOCUMENTS

| | | | |
|---|---|---|---|
| 2002/0021017 A1* | 2/2002 | Foltz | B60K 15/0406 296/97.22 |
| 2007/0046062 A1* | 3/2007 | Yoshimura | B29C 45/4407 296/97.22 |
| 2008/0016334 A1 | 1/2008 | Kurapati et al. | |
| 2009/0094671 A1 | 4/2009 | Kurapati et al. | |
| 2009/0189410 A1* | 7/2009 | Gurtatowski | B60K 15/05 296/97.22 |
| 2012/0161462 A1* | 6/2012 | Zentner | B60K 15/04 296/97.22 |
| 2013/0249234 A1* | 9/2013 | Higgins | B60K 15/05 296/97.22 |
| 2015/0217638 A1* | 8/2015 | Chiba | B60K 15/05 296/97.22 |

FOREIGN PATENT DOCUMENTS

| | | |
|---|---|---|
| JP | 7-37757 U | 7/1995 |
| JP | 2508621 Y2 | 8/1996 |
| JP | 2005-075112 A | 3/2005 |
| JP | 2007153011 A | 6/2007 |
| WO | 2006/008856 A1 | 1/2006 |

OTHER PUBLICATIONS

International Search Report of PCT/JP2013/072321 dated Oct. 1, 2013 [PCT/ISA/210].

Communication dated Feb. 29, 2016, issued by the Korean Intellectual Property Office in corresponding Korean Application No. 10-2015-7009580.

* cited by examiner

SUPPORT STRUCTURE FOR FUEL LID

CROSS REFERENCE TO RELATED APPLICATIONS

This application is a National Stage of International Application No. PCT/JP2013/072321, filed Aug. 21, 2013, claiming priority based on Japanese Patent Application No. 2012-205890, filed Sep. 19, 2012, the contents of all of which are incorporated herein by reference in their entirety.

FIELD OF THE INVENTION

The preset invention relates to a support structure for reducing rattling of a fuel lid while the fuel lid is being closed or in a closed state.

BACKGROUND OF THE INVENTION

Patent document 1 describes an example of a technology relating to a fuel lid support structure. The fuel lid support structure of patent document 1 includes two legs, which are arranged on the back surface of a fuel lid and limit movement of the fuel lid, a contact portion (closing-direction limit portion), which limits movement of the fuel lid in the closing direction, and an upper change portion and a lower change portion (plane-direction limit portions) that limit movement of the fuel lid in directions along a plane that is substantially perpendicular to the closing direction (plane directions). The contact portion, the upper change portion, and the lower change portion are arranged on the fuel adaptor of the vehicle body. When the fuel lid is closed, the legs of the fuel lid are in contact with the closing-direction limit portion and the plane-direction limit portions of the fuel adaptor. This limits movement of the fuel lid.

Such a structure limits movement of the closed fuel lid in the closing direction and directions along a plane that is substantially perpendicular to the closing direction. Patent document 1 describes that the structure limits pivoting of the fuel lid about the fixing portion between the hinge and the vehicle body in the plane directions even when a lightweight hinge is used that is fixed to the vehicle body by a single bolt.

PRIOR ART DOCUMENTS

Patent Documents

Patent Document 1: Japanese Laid-Open Patent Publication No. 2005-75112

SUMMARY OF THE INVENTION

To avoid interference between the legs of the fuel lid and the plane-direction limit portions of the fuel adaptor when closing the fuel lid, a clearance is required between the legs and the plane-direction limit portions. The fuel lid tends to rattle when the clearance is large. That is, the plane-direction limit portions are hindered from functioning as limit portions. Thus, the clearance is desired to be minimized. Minimization of the clearance requires high dimensional accuracy of components.

However, the closing-direction limit portion and the plane-direction limit portions of the fuel lid support structure of patent document 1 are formed by projections and depressions (steps) formed in the fuel adaptor. Thus, accuracy in the formation of projections and depressions in the fuel adaptor affects the accuracy of the clearance. Variations in the accuracy of projection and depression formation result in variations in clearances.

Further, the coupling position of the fuel adaptor, which includes the plane-direction limit portions, may vary. This may cause variations in clearances and rattling of the fuel lid.

It is an object of the present disclosure to provide a fuel lid support structure that can easily reduce rattling of a fuel lid.

To achieve the foregoing objective, a support structure of a fuel lid that is coupled to a vehicle body by a hinge is provided. The support structure includes an annular rubber seal and a contact plate. The annular rubber seal is located on the vehicle body to surround a fuel filler of the vehicle body. The rubber seal includes an upper surface and an inner circumferential surface. The contact plate is located on a back surface of the fuel lid and capable of contacting the rubber seal when the fuel lid is in a closed state. The contact plate includes an upper surface contact portion, which contacts the upper surface of the rubber seal, and an inner surface contact portion, which contacts the inner circumferential surface of the rubber seal.

DETAILED DESCRIPTION OF THE PREFERRED EMBODIMENTS

Embodiments of the present invention will now be described with reference to the drawings.

First Embodiment

Figure 1:
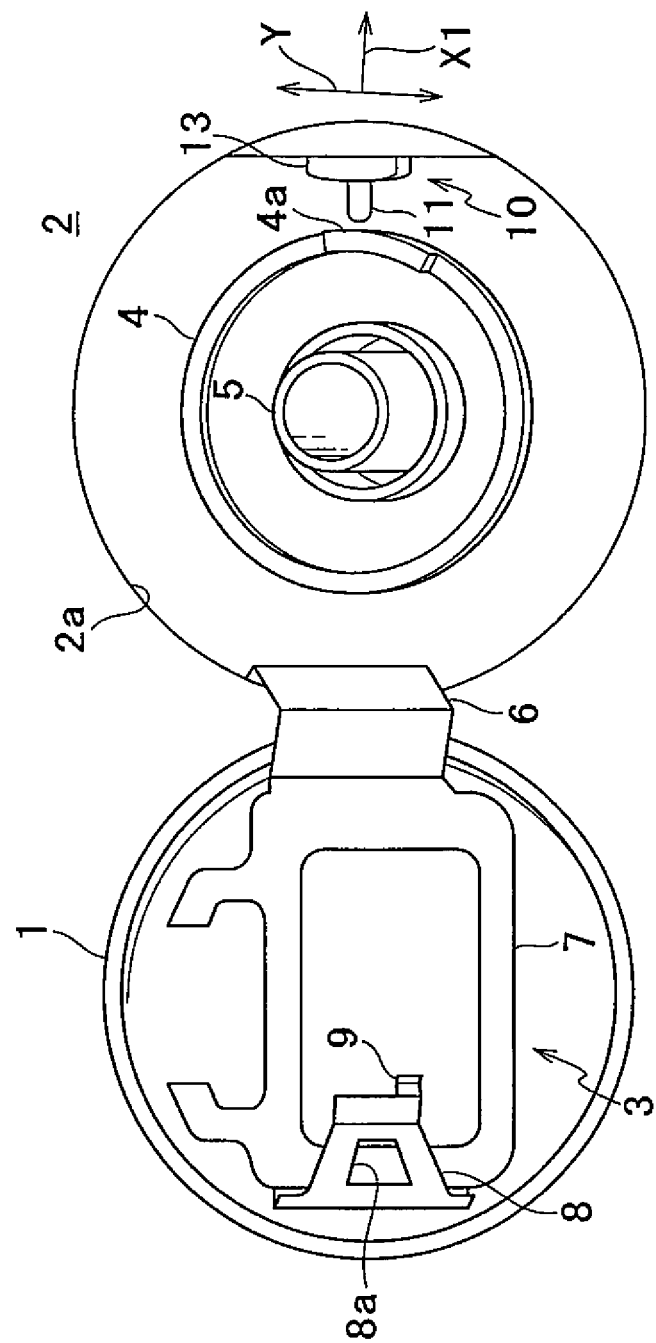
FIG. 1 is a perspective view showing a support structure of a fuel lid of a first embodiment in which the fuel lid is opened.
Figure 2:
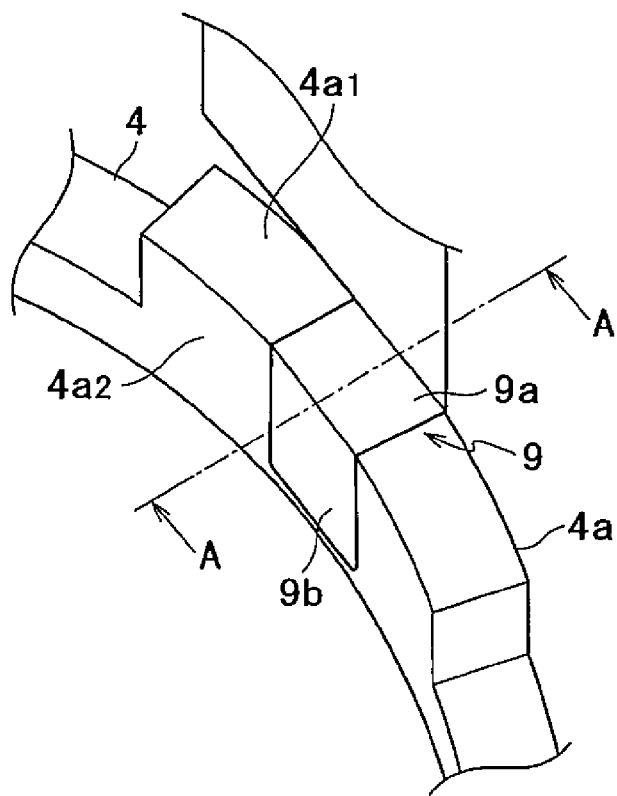
FIG. 2 is an enlarged perspective view showing a contact plate when the fuel lid of FIG. 1 is closed.
Figure 3:
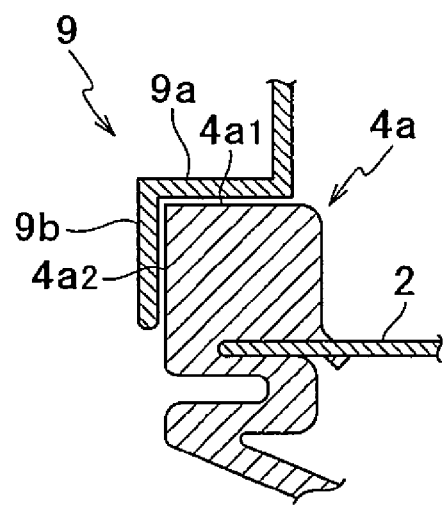
FIG. 3 is a cross-sectional view taken along line III-III in FIG. 2.

Referring to FIGS. 1 to 3, a first embodiment of the present invention will now be described. As shown in FIG. 1, a fuel lid 1 opens and closes a circular opening 2a that is formed in a vehicle body 2 of a passenger car, for example. A fuel filler 5 is located substantially at the center in the opening 2a. The fuel filler 5 is the distal end portion of the fuel pipe extending from the fuel tank. Opening and closing of the fuel lid 1 exposes and hides the fuel filler 5. A cap (not shown) is attached to the fuel filler 5.

The fuel lid 1 (fuel filler 5) is located in the rear section of a side surface of the vehicle body 2, for example. When the fuel lid 1 is closed, the outer surface of the fuel lid 1 is flush with the outer surface of the vehicle body 2.

In the present embodiment, when the fuel lid 1 is closed, the outer surface of the fuel lid 1 is slightly tilted from the vertical direction toward the center of the vehicle body 2. More specifically, when the fuel lid 1 is closed, the upper section of the fuel lid 1 is located rearward of the lower section of the fuel lid 1 as viewed in FIG. 1 (the second embodiment is structured in the similar manner).

Rubber Seal

An annular (ring-shaped) rubber seal 4 is located around the fuel filler 5 to surround the fuel filler 5 with a predetermined distance from the fuel filler 5. The rubber seal 4 is coupled to the vehicle body 2 in the opening 2a. The rubber seal 4, which is an annular rubber product having a predetermined thickness, prevents entry of rainwater running on the surface of the vehicle body 2 into the fuel filler 5, for example.

The fuel lid 1 is made of a steel plate, for example. In this embodiment, the fuel lid 1 is circular. However, the fuel lid 1 and the opening 2a may have oval, tetragonal, or other shapes.

On the back surface of the fuel lid 1, a fuel lid inner panel 3 (hereinafter referred to as "inner panel") is coupled. A hinge 6 is fixed to one end of the inner panel 3, and an engagement portion 8 is formed at the opposite end. That is, the inner panel 3 includes a main body 7 and the engagement portion 8 that is located at one end of the main body. The inner panel 3 and the hinge 6 are made of steel plates, for example.

As described above, one end of the hinge 6 is fixed to the inner panel 3, and the other end is coupled to the vehicle body 2. In other words, the hinge 6 couples the fuel lid 1 to the vehicle body 2. A spring (elastic body), which is not shown, is located at the end of the hinge 6 that is coupled to the vehicle body 2. The spring urges the closed fuel lid 1 in the opening direction.

The engagement portion 8, which is formed at one end of the inner panel 3, locks the fuel lid 1 in the closed state to the vehicle body (brings the fuel lid 1 into engagement with the vehicle body) against the urging force of the spring. The engagement portion 8 includes an engagement hole 8a. A lock mechanism 10, which includes a pin 11, is coupled to the position of the vehicle body 2 that corresponds to the engagement portion 8. The engagement of the pin 11 with the engagement hole 8a locks the fuel lid 1 in the closed state to the vehicle body.

When an unlocking operation is performed, the pin 11 is inserted into a main body 13 of the lock mechanism 10 so that the pin 11 is disengaged from the engagement portion 8. This opens the fuel lid 1, which is urged in the opening direction, by a predetermine amount. Then, the fuel lid 1 is manually opened for fueling, for example.

Contact Plate

A contact plate 9 is formed at an end of the distal end portion of the engagement portion 8. The contact plate 9 is capable of contacting the annular rubber seal 4, which is located on the vehicle body 2, when the fuel lid 1 is closed. The contact plate 9 is made of a steel plate, for example.

As shown in FIGS. 2 and 3, the contact plate 9 includes an upper surface contact portion 9a, which contacts an upper surface 4a1 of the rubber seal 4, and an inner surface contact portion 9b, which contacts an inner circumferential surface 4a2 of the rubber seal 4. The inner surface contact portion 9b extends from the upper surface contact portion 9a. The inner surface contact portion 9b may be formed by bending or may be connected to the upper surface contact portion 9a by welding, for example.

The rubber seal 4 includes a contact portion 4a that contacts the contact plate 9 and is higher than the other portion of the rubber seal 4. In other words, the contact portion 4a is longer than the other portion of the rubber seal 4 in the axial direction of the rubber seal 4. However, the portion of the rubber seal 4 that contacts the contact plate 9 does not necessarily have to be higher than the other portion of the rubber seal 4.

The contact portion 4a that is higher than the other portion of the rubber seal 4 increases the contact area between the inner surface contact portion 9b of the contact plate 9 and the inner circumferential surface 4a2 of the rubber seal 4. This effectively reduces rattling of the fuel lid 1 in the three directions shown in FIG. 1, namely, the two directions indicated by double-headed arrow Y and the one direction indicated by single-headed arrow X1, among the directions along the plane that is substantially perpendicular to the closing direction (axial direction of the rubber seal 4) of the fuel lid 1 (the directions along the surface of the vehicle body 2, which hereinafter referred to as "plane directions").

In addition, increase in the dimension in the axial direction of the rubber seal 4 (closing direction of the fuel lid 1) increases the elasticity of the contact portion 4a. This further reduces rattling of the fuel lid 1 in the closing direction.

In the rubber seal 4 of the present embodiment, the upper surface 4a1 and the inner circumferential surface 4a2 of the contact portion 4a form an angle of about 90 degrees. Accordingly, in the contact plate 9, the inner surface contact portion 9b forms an angle of about 90 degrees with the upper surface contact portion 9a. The cross-sectional shape of the contact portion 4a of the rubber seal 4 and the angle formed by the upper surface contact portion 9a and the inner surface contact portion 9b of the contact plate 9 are not limited to those described above and may be modified as the second embodiment, which will be described below.

In the present embodiment, the contact plate 9 is located at one end of the distal end portion of the engagement portion 8 that is formed in the inner panel 3. However, the contact plate 9 may be located in the center of the distal end portion of the engagement portion 8.

When the fuel lid 1 is closed by pivoting about the hinge 6, the contact plate 9 is located in the position shown in FIGS. 2 and 3. The upper surface contact portion 9a of the contact plate portion 9 limits movement of the fuel lid 1 in the closing direction. The inner surface contact portion 9b of the contact plate 9 limits movement of the fuel lid 1 in the three directions shown in FIG. 1, namely, the two directions indicated by double-headed arrow Y and the one direction indicated by single-headed arrow X1, among the plane directions of the fuel lid 1. The inner circumferential surface 4a2 of the annular rubber seal 4 is curved to have a circular (arcuate) shape. The contact between the curved inner circumferential surface 4a2 and the inner surface contact portion 9b of the contact plate 9 advantageously limits movement of the fuel lid 1 in the three direction (two directions indicated by double-headed arrow Y and one direction indicated by single-headed arrow X1) among the plane directions of the fuel lid 1.

Second Embodiment

Figure 4:
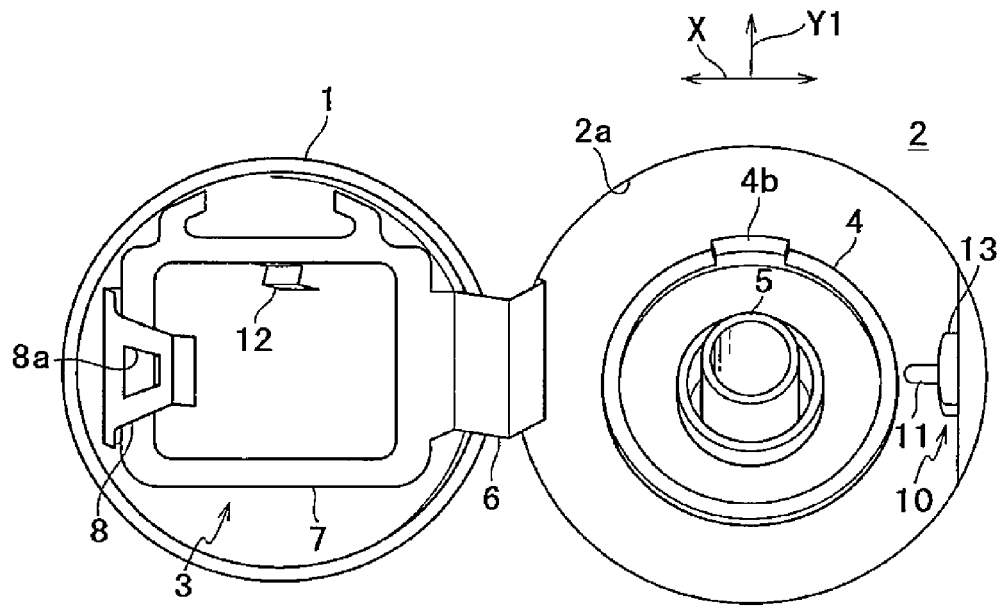
FIG. 4 is a perspective view showing a support structure of a fuel lid of a second embodiment in which the fuel lid is opened.

A second embodiment of the present invention will now be described with reference to FIGS. 4 to 6. The same reference numerals are given to those components that are like or the same as the corresponding components of the first embodiment.

In the first embodiment, the contact plate 9 is located in the engagement portion 8 that is formed in the inner panel 3. In the present embodiment, a contact plate 12 that is capable of contacting the rubber seal 4 is located in the main body 7 of the inner panel 3.

Figure 5:
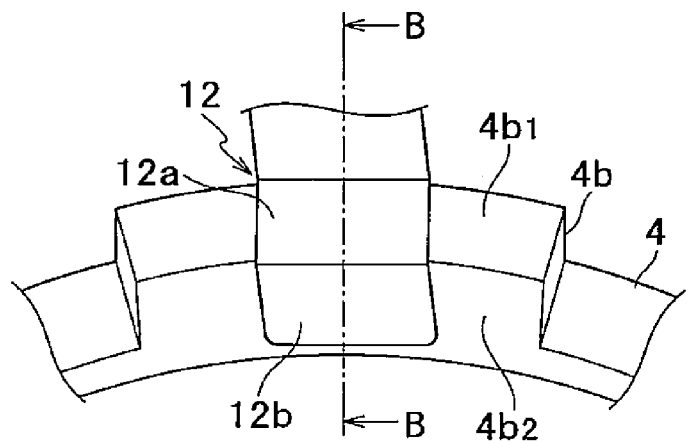
FIG. 5 is an enlarged perspective view showing a contact plate when the fuel lid of FIG. 4 is closed.
Figure 6:
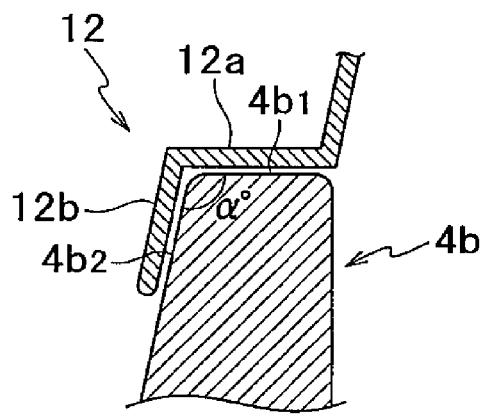
FIG. 6 is a cross-sectional view taken along line VI-VI in FIG. 5.

As shown in FIGS. 5 and 6, the contact plate 12 includes an upper surface contact portion 12a, which contacts an upper surface 4b1 of the rubber seal 4, and an inner surface contact portion 12b, which contacts an inner circumferential surface 4b2 of the rubber seal 4. The inner surface contact portion 12b extends from the upper surface contact portion 12a. The inner surface contact portion 12b may be formed by bending or may be connected to the upper surface contact portion 12a by welding, for example.

In the same manner as the first embodiment, the rubber seal 4 includes a contact portion 4b that contacts the contact plate 12 and is higher than the other portion of the rubber seal 4.

In the first embodiment, the contact portion 4a of the rubber seal 4 is formed such that the inner circumferential surface 4a2 forms an angle of about 90 degrees with the upper surface 4a1. In the present embodiment, the contact portion 4b of the rubber seal 4 is formed such that the inner circumferential surface 4b2 is tilted to form an angle $\alpha$ that is greater than 90 degrees with the upper surface 4b1. That is, the inner circumferential surface 4b2 of the contact portion 4b is a tilted surface that is closer to the fuel filler 5 (the center of the rubber seal 4) at locations closer to the bottom of the opening 2a.

Further, the inner surface contact portion 12b of the contact plate 12 is bent to extend along the inner circumferential surface 4b2 (tilted relative to the upper surface contact portion 12a).

When the fuel lid 1 is closed by pivoting about the hinge 6, the contact plate 12 is located in the position shown in FIGS. 5 and 6. The upper surface contact portion 12a of the contact plate 12 limits movement of the fuel lid 1 in the closing direction. The inner surface contact portion 12b of the contact plate 12 limits movement of the fuel lid 1 in the three directions shown in FIG. 4, namely, the two directions indicated by double-headed arrow X and the one direction indicated by single-headed arrow Y1, among the plane directions of the fuel lid 1.

Operation and Advantages

The embodiments described above use the annular rubber seal 4, which is located on the vehicle body 2 and surrounds the fuel filler 5, as a component that prevents rattling of the fuel lid 1. The dimensional accuracy of the inner circumferential surface of the annular rubber seal 4 can be easily improved. That is, the inner circumferential surface of the annular rubber seal 4 can easily have high dimensional accuracy. In addition, since the rubber seal 4 is annular, even if the rubber seal 4 is slightly rotated from the proper coupling position when coupled to the vehicle body 2, its cross-sectional shape remains unchanged (the positional relationship between the contact plate and the contact portion of the rubber seal 4 hardly changes).

That is, the component (section) that prevents rattling of the fuel lid 1 can easily have high dimensional accuracy, and rattling of the fuel lid 1 can be reduced even if the coupling position of the component varies.

The inner circumferential surface of the annular rubber seal 4 is curved. The structure in which the curved inner circumferential surface contacts the contact plate advantageously limits movement of the fuel lid in the three directions among the directions along the plane that is substantially perpendicular to the closing direction of the fuel lid 1 (plane directions), and the limitation of movement is achieved just by a single component.

Further, in the first and second embodiments, the contact plates 9 and 12 are portions of the inner panel 3 that are located on the back surface of the fuel lid 1 and to which the hinge 6 is fixed. Thus, the hinge 6, which pivots the fuel lid 1, and the contact plates 9 and 12 are coupled only at the fixing portion between the inner panel 3 and the hinge 6. In other words, this structure includes a small number of coupling portions between the hinge 6 and the contact plates 9 and 12, thereby further reducing rattling of the fuel lid 1.

Rattling of the fuel lid 1 can be further reduced by forming the contact plate 9 in the engagement portion 8, which is formed in the inner panel 3 and brings the fuel lid 1 into engagement with the vehicle body 2. In closing the fuel lid 1, the section in the surface of the fuel lid 1 that corresponds to the engagement portion 8 is often pressed. Since the contact plate 9 is located near the section that is pressed, rattling of the fuel lid 1 can be further reduced.

The engagement portion 8, which includes the contact plate 9, is formed at the end of the inner panel 3 that is opposite (180 degree opposite) to the end to which the hinge 6 is fixed. That is, the contact plate 9 is formed at the section where rattling originating in the hinge 6 is greatest. This allows the contact plate 9 to stably limit movement of the fuel lid 1. As a result, rattling of the fuel lid 1 is further reduced.

The present invention is not limited to the preferable embodiments and examples described above, and various design modifications can be made within the scope of the invention as defined in the claims.

For example, the fuel lid support structure may include both of the contact plate 9 of the first embodiment (the contact plate 9 formed in the engagement portion 8) and the contact plate 12 of the second embodiment. Further, the inner surface contact portions 9b and 12b may have curved surfaces that extend along the inner circumferential surfaces 4a2 and 4b2 of the rubber seal 4, and each may include only a flat surface or a plurality of flat surfaces.

The positions of the contact plates 9 and 12 are not limited to the inner panel 3 as long as these portions are located on the back surface of the fuel lid 1. For example, the contact plates 9 and 12 may be directly coupled to the back surface of the fuel lid 1.

The invention claimed is:

1. A support structure of a fuel lid that is coupled to a vehicle body by a hinge, the support structure comprising:
   an annular rubber seal located on the vehicle body to surround a fuel filler of the vehicle body, to prevent entry of liquid running on the surface of the vehicle body into the fuel filler, wherein the rubber seal includes an upper surface and an inner circumferential surface extending from the upper surface so as to face the fuel filler; and
   a contact plate that is located on a back surface of the fuel lid and contacts the rubber seal when the fuel lid is in a closed state, wherein
   the contact plate includes an upper surface contact portion, which contacts the upper surface of the rubber seal, and an inner surface contact portion, which contacts the inner circumferential surface of the rubber seal.

2. The support structure of a fuel lid according to claim 1, further comprising a fuel lid inner panel that is located on the back surface of the fuel lid and to which the hinge is fixed, wherein
   the contact plate is a portion of the fuel lid inner panel.

3. The support structure of a fuel lid according to claim 2, wherein the fuel lid inner panel includes an engagement portion that brings the fuel lid into engagement with the vehicle body, and
   the contact plate is formed in the engagement portion.

4. The support structure of a fuel lid according to claim 3, wherein the hinge is fixed to one end of the fuel lid inner panel, and the engagement portion is formed at another end of the fuel lid inner panel.

5. The support structure of a fuel lid according to claim 1, wherein
   the rubber seal includes a contact portion that contacts the contact plate when the fuel lid is in the closed state, and the contact portion is longer than other portions of the rubber seal in an axial direction of the rubber seal.

6. The support structure of a fuel lid according to claim 1, wherein the inner circumferential surface of the rubber seal forms an angle greater than 90 degrees with the upper surface.

7. The support structure of a fuel lid according to claim 1, wherein the contact plate is formed of a metal plate.

8. The support structure of a fuel lid according to claim 1, further comprising an engagement portion configured to engage with the fuel body in the closed state, wherein the contact plate is formed at a distal end portion of the engagement portion.

* * * * *